Jan. 14, 1941.   B. D. H. TELLEGEN ET AL   2,228,858
SOUND INTENSITY INDICATOR AND CONTROL
Filed Dec. 15, 1938
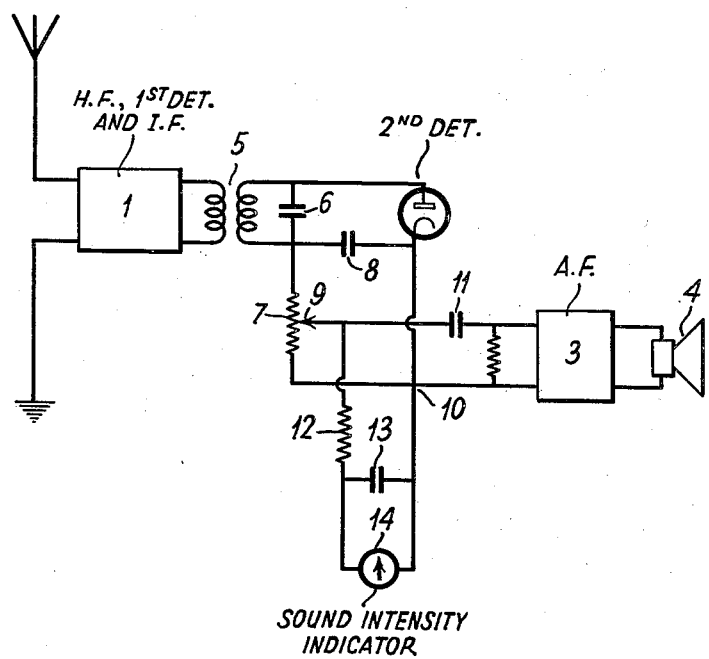
INVENTORS
B. D. H. TELLEGEN
J. L. H. JONKER
BY
ATTORNEY Patented Jan. 14, 1941

2,228,858

UNITED STATES PATENT OFFICE 2,228,858

SOUND INTENSITY INDICATOR AND CONTROL

Bernardus Dominicus Hubertus Tellegen and Johan Lodewijk Hendrik Jonker, Eindhoven, Netherlands, assignors, by mesne assignments, to Radio Corporation of America, New York, N. Y., a corporation of Delaware Application December 15, 1938, Serial No. 245,830 In Germany May 30, 1938

2 Claims. (Cl. 250—20)

The invention relates to a radio-receiver provided with a hand-operated sound intensity control. If the sound intensity control is adjusted such that broadcasting is reproduced with a sound intensity which is satisfactory to the listener and the circumstances happen to be such that at the moment of adjustment just a feeble part of the broadcasting is received, the sound intensity during reproduction of a loud part will be too great and be felt by the listener as unpleasant. On the other hand the feeble parts are frequently reproduced with a too low sound intensity, if adjustment is made during a loud part of the broadcasting. It is therefore advisable to provide a receiver with a sound intensity indicator which permits the hand-operated sound control device to be adjusted to the desired mean sound intensity independently of the sound intensity available at the moment of adjustment.

According to the invention, for this purpose a D. C. voltage is conducted to the sound intensity indicator which is proportional to the amplitude of the carrier wave and is varied automatically in accordance with the adjustment of the hand-operated sound control device.

The invention will be more clearly understood with reference to the accompanying drawing showing, by way of example, an embodiment of a radio-receiver according to the invention.

Said receiver contains, as usual, a high-frequency and intermediate frequency part 1, a second detector constituted by a diode 2, a low-frequency amplifier 3 and finally a loudspeaker 4.

The oscillations amplified in the last intermediate frequency amplifier stage are conducted to the diode 2 through a transformer 5, the secondary winding of which is tuned to intermediate frequency by means of a condenser 6. After rectification a voltage drop is then produced across a resistance 7 which is shunted for the intermediate frequency by a condenser 8, this voltage drop being constituted by two parts, i. e. a D. C. voltage and a low frequency A. C. voltage. A part of the latter A. C. voltage produced between the tapping 9 which serves for the sound intensity control, and the point 10 is conducted to the input circuit of the low-frequency amplifier 3 through a condenser 11.

According to the invention, the part of the D. C. voltage drop at the resistance 7 produced between the points 9 and 10 is connected to an indicator 14 through a filter which is constituted by a resistance 12 and a condenser 13 and which can transmit direct current, but does not transmit low frequencies. This indicator may be constituted, for example, by a cathode ray indicator (tuning tube) or by a meter.

If for the purpose of sound intensity control the adjustment of the tapping 9 is varied, the low frequency A. C. voltage conducted to the low frequency amplifier 3 is varied as well as the D. C. voltage fed to the sound intensity indicator 14. This D. C. voltage is proportional to the amplitude of the received carrier wave, but independent of the fact, whether a loud or feeble part of the broadcasting is received. With a determined maximum modulation percentage of the received carrier wave, the maximum amplitude of the low frequency A. C. voltage produced at the resistance 7 is a certain fraction of the D. C. voltage drop produced also at this resistance. If, for example, the modulation percentage is 30%, the maximum amplitude of the low frequency A. C. voltage is 30% of the D. C. voltage. The same ratio also exists between the maximum amplitude of the low frequency A. C. voltage and the D. C. voltage between the points 9 and 10, indifferently how the tapping 9 is adjusted. The indication of the sound intensity indicator 14 is therefore a measure for the maximum amplitude of the low frequency A. C. voltage produced between the points 9 and 10 and accordingly also for the maximum occurring sound intensity with the reproduction. Consequently, if the sound intensity indicator 14 is calibrated or if one knows from experience how its indication corresponds to the sound intensity, the tapping 9 can be adjusted such that an indication is obtained which corresponds to the sound intensity desired with the maximum amplitude of the low frequency A. C. voltage.

What is claimed is:

1. A radio receiver of modulated waves comprising a diode rectifier and load resistance therefor, and an audio frequency amplifier and loudspeaker, the audio frequency amplifier being connected through a condenser across a variable portion of said resistance for volume control, and a sound intensity indicator directly connected across the same variable portion of said resistance for indicating the maximum volume of sound that can appear at the loudspeaker even in the presence of 100 percent modulation of said wave, the said indicator adapted to produce an indication directly proportional to the direct current component of voltage developed across said variable portion of the resistance.

2. A radio receiving circuit including a rectifier for rectifying alternating voltages impressed thereon, an output circuit for said rectifier including a sound intensity control device comprising a resistor and a movable contact arm, an audio amplifier connected to the output of said rectifier through the movable arm of said sound intensity control device, and means permitting said sound intensity control device to be adjusted to a desired mean sound intensity independently of the sound intensity available at the moment of adjustment, comprising a sound intensity indicator connected directly to the movable contact arm whereby the proportions of direct current voltage and the alternating current voltage developed across the resistor and fed respectively to the indicator and to the audio amplifier are substantially the same.

BERNARDUS DOMINICUS
        HUBERTUS TELLEGEN.
JOHAN LODEWIJK
        HENDRIK JONKER.